United States Patent [19]

Isnardi et al.

[11] Patent Number: 5,070,396
[45] Date of Patent: Dec. 3, 1991

[54] COMPATIBLE WIDESCREEN TELEVISION SYSTEM

[75] Inventors: Michael A. Isnardi, Plainsboro; Jack S. Fuhrer, Princeton Junction, both of N.J.

[73] Assignee: General Electric Company, Princeton, N.J.

[21] Appl. No.: 435,227

[22] Filed: Nov. 6, 1989

[51] Int. Cl.$^5$ .................................... H04N 11/06
[52] U.S. Cl. ................................ 358/12; 358/11
[58] Field of Search ............................ 358/11, 12

[56] References Cited

U.S. PATENT DOCUMENTS 4,839,720  6/1989  Isnardi .................. 358/12

FOREIGN PATENT DOCUMENTS 61-213185  10/1985  Japan .
0084685    4/1987   Japan .
62-206992  9/1987   Japan .

OTHER PUBLICATIONS

Isnardi et al., "Encoding for Compatibility and Recoverability in the ACTV System", IEEE Transactins on Broadcasting, vol. BD-33, No. 4, Dec. 1987.

Primary Examiner—James J. Groody
Assistant Examiner—David E. Harvey
Attorney, Agent, or Firm—Joseph S. Tripoli; Eric P. Herrmann; Ronald H. Kurdyla

[57] ABSTRACT

In a widescreen signal encoding system for a television-type signal, side panel chrominance information is conveyed in double sideband form on an auxiliary subcarrier having a field inverting phase relative to the phase of a standard chrominance subcarrier. Side panel high frequency luminance information exclusive of low frequency information also is conveyed on the auxiliary subcarrier, but in single sideband form. Illustratively the auxiliary subcarrier is at the 3.58 MHz frequency of the standard chrominance subcarrier.

24 Claims, 5 Drawing Sheets

16 X 9 WIDESCREEN DISPLAY

COMPATIBLE WIDESCREEN TELEVISION SYSTEM

This invention concerns apparatus for processing a widescreen television-type signal having an image aspect ratio, e.g., 16×9, greater than that of a standard television image.

A conventional television receiver, such as a receiver in accordance with the NTSC broadcast standard adopted in the United States and elsewhere, has a 4:3 aspect ratio (the ratio of the width to the height of a displayed image). Recently, there has been interest in using higher aspect ratios for television systems, such as 2:1, 5:3 or 16:9, since such higher aspect ratios more nearly approximate or equal the aspect ratio of the human eye than does the 4:3 aspect ratio of a standard television receiver display.

It is desirable for widescreen television systems to be compatible with standard television receivers to facilitate the widespread adoption of widescreen systems. One known compatible widescreen television system is described by M. A. Isnardi et. al. in an article "Encoding for Compatibility and Recoverability in the ACTV System", published in *IEEE Transactions on Broadcasting*, Vol. BC-33, December 1987, and in U.S. Pat. No. 4,855,811 of M. A. Isnardi. This known system includes apparatus designed for processing a widescreen video signal representing a 5×3 aspect ratio image to develop a compatible widescreen television signal which produces a standard 4×3 aspect ratio display when received by a conventional television receiver, and which produces a widescreen 5×3 aspect ratio display when received by a widescreen television receiver. In this known system, low frequency side panel information is time compressed 6:1 (resulting in a proportional increase in frequency) and placed in the horizontal overscan regions of the center panel information component. High frequency side panel information is time expanded about 1:4.4 (resulting in a proportional decrease in frequency) before modulating a 3.1 MHz auxiliary subcarrier having a field alternating phase, forming a double sideband auxiliary signal which is combined with the main panel signal before being transmitted. To assist a decoder in recovering the center and side panel components at a widescreen receiver, the side panel and center panel luminance components are intraframe averaged above 700 KHz and 1.5 MHz respectively before modulation and combination at the transmitter.

If the described known compatible widescreen system were to process a 16×9 aspect ratio signal, images displayed by conventional NTSC receivers would exhibit noticeable geometric distortion, i.e., images would appear about 14% thinner. Geometric image distortion of about 5% or less is typically not noticeable by viewers. An attempt to meet this 5% distortion limit in the case of the known widescreen system resulted in having to reduce the side panel high frequency expansion factor, due to the side panel regions of a 16×9 display being wider than those of a 5×3 display. This produced an undesirable increase in the bandwidth of the time expanded side panel information. This matter, among others, is addressed and resolved by apparatus in accordance with the present invention.

In a compatible widescreen signal processing system according to the present invention, time expanded side panel chrominance information is conveyed on an auxiliary subcarrier in double sideband form, and time expanded high frequency side panel luminance information is conveyed on an auxiliary subcarrier in single sideband form. In a preferred embodiment of the invention, an auxiliary subcarrier, at the frequency of a conventional chrominance subcarrier but exhibiting a field inverting phase relative to the phase of the chrominance subcarrier, is modulated both by the time expanded side panel chrominance information to produce a double sideband modulated signal, and by time expanded high frequency side panel luminance information exclusive of DC information to produce a single sideband modulated signal.

Figure 4:
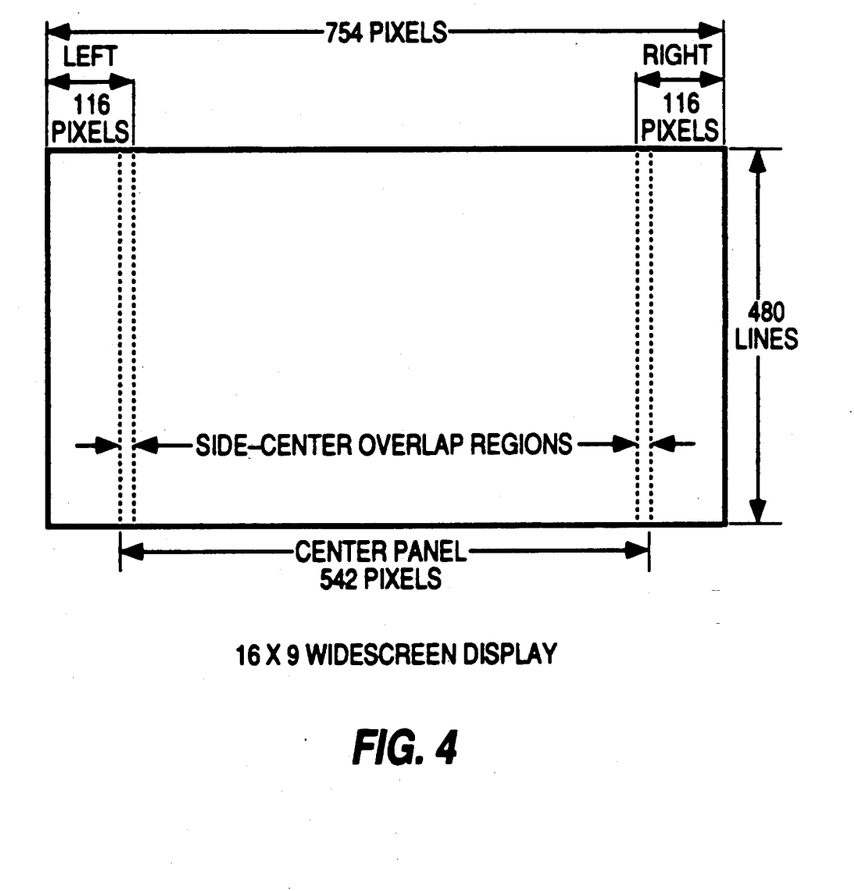
FIG. 4 shows details of a 16×9 widescreen display associated with apparatus according to the invention.

As shown by FIG. 4, the width of an image display of a 16×9 aspect ratio widescreen display encompasses 754 image pixels, 542 of which constitute the center (main) panel display area and 116 of which constitute each of the left and right side panel areas as shown. The seams between the center panel area and the left and right side panel areas each include an overlap region containing about 5–10 pixels which may be processed in a variety of known ways to render the side-center seams virtually transparent to a viewer. The method of encoding side panel information in accordance with the principles of the present invention will be discussed before describing the overall operation of the system.

In the system to be described, television signals are sourced with a baseband bandwidth of 0–5.4 MHz, which is slightly greater than the 0–4.2 MHz baseband bandwidth of a standard NTSC video signal. The additional bandwidth assures that after time expansion and compression of the video signal as will be discussed, a resulting main signal component exhibits a 4:3 aspect ratio and a 0–4.2 MHz video bandwidth compatible with the signal processing requirements of a standard NTSC television system.

Figure 1:
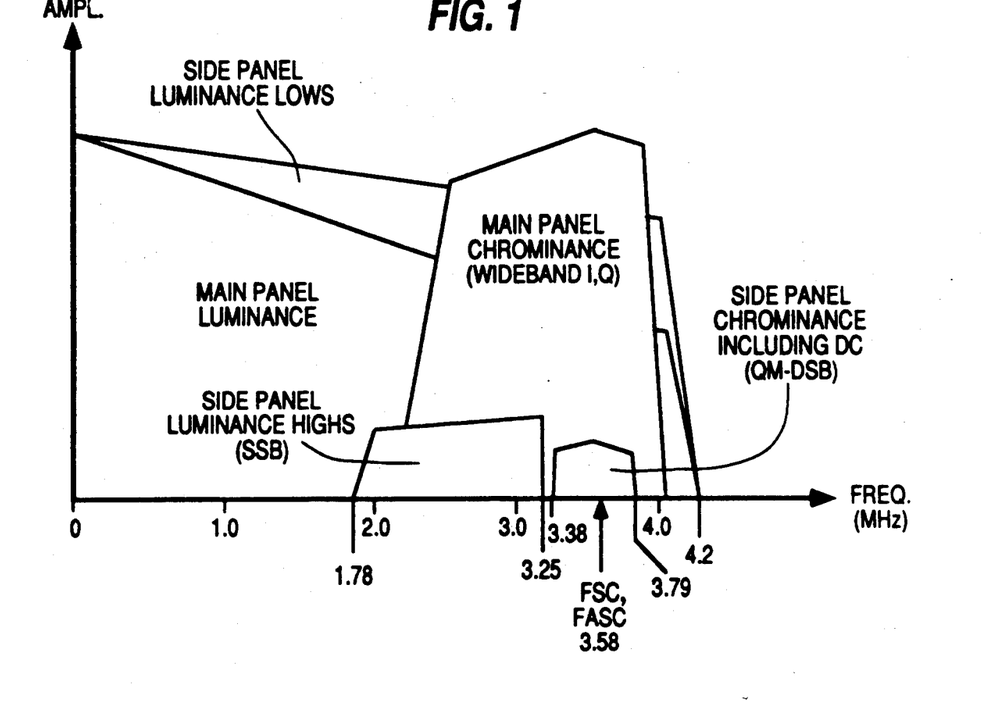
FIG. 1 illustrates a baseband frequency spectrum of a widescreen television signal developed in accordance with the principles of the present invention.
Figure 5:
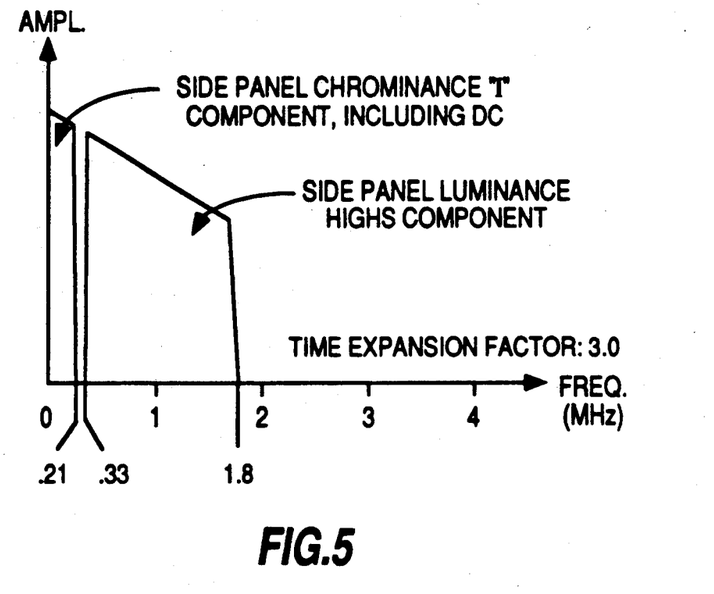
FIGS. 5 and 6 show baseband frequency spectrums of widescreen signal components according to the invention.

Referring now to the frequency spectrum in FIG. 1, side panel luminance high frequency information ("side highs") exclusive of low frequency information including DC is time expanded and transmitted as a single sideband component of an auxiliary subcarrier signal (ASC) at a baseband frequency FASC of 3.58 MHz, which is also the frequency FSC of the standard chrominance subcarrier (actually 3.579545 MHz). The chrominance subcarrier is quadrature modulated with the center panel (main panel) I and Q components. Before time expansion, the luminance side highs signal has energy in the frequency range of 1.0 MHz to 5.4 MHz. After time expansion by a factor of 3.0, the side highs information is mapped to a lower frequency range of 0.33 MHz to 1.8 MHz, as shown in FIG. 5. Side panel low frequency luminance information including DC is time compressed into horizontal overscan regions as described in U.S. Pat. No. 4,816,899—Strolle et al.

The 3.58 MHz auxiliary subcarrier has a phase which inverts from field to field relative to the phase of the standard chrominance subcarrier. The lower sideband of the modulated time expanded luminance side highs component ranges from 1.78 MHz to 3.25 MHz. The upper sideband of the modulated time expanded luminance side highs component, which is removed by a 3.58 MHz lowpass filter, ranges from 3.91 MHz to 5.38 MHz (not shown).

Figure 6:
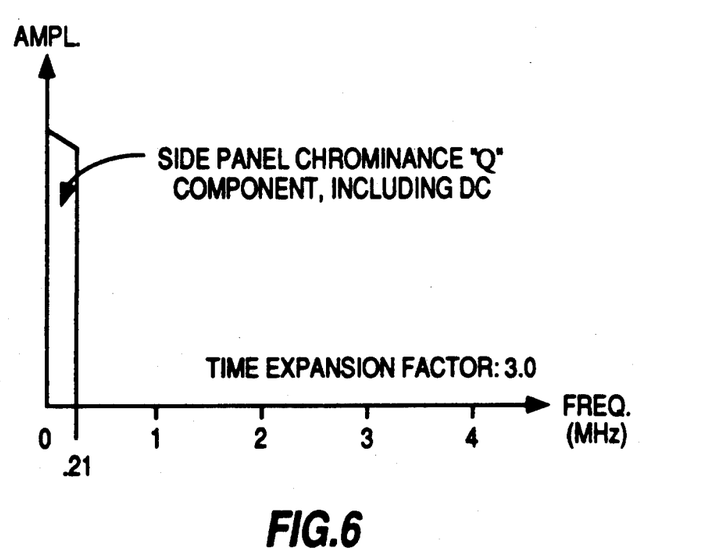

The side panels contain narrowband "I" and "Q" chrominance information with a bandwidth of 642 KHz (including DC), which is 1.284 times the 500 KHz bandwidth of standard NTSC narrowband chrominance components. The factor 1.284 is a center panel time expansion factor required to develop an NTSC compatible main component from the original widescreen signal. After time expansion by a factor of 3.0, the side panel chrominance I and Q bandwidths drop from 642 KHz to about 210 KHz, as shown in FIGS. 5 and 6. This bandwidth is small enough to occupy the frequency gap between the upper limit of the lower sideband of the modulated luminance side highs information (3.25 MHz) and the upper frequency limit of the video spectrum (4.2 MHz), as shown in FIG. 1.

The time expanded side panel I and Q chrominance components quadrature modulate the same auxiliary subcarrier that is modulated with the time expanded side panel luminance high frequency information. In this example the side panel I component and the side panel luminance highs component are modulated by the same phase of the auxiliary subcarrier. Alternatively, the side panel Q component and the side panel luminance highs component could be modulated by the same phase of the auxiliary subcarrier.

The side panel component of the frequency spectrum shown in FIG. 1 advantageously exhibits negligible energy in the vicinity of the high frequency limit (4.2 MHz) of the video band due to a 0.41 MHz guardband between the upper limit of the sideband modulation spectrum (3.79 MHz) and the 4.2 MHz upper limit of the video band. Thus side panel information is largely insensitive to unwanted side effects of IF (Intermediate Frequency) signal processing, such as group delay. The guardband is determined in accordance with the expression $$F - (FASC + SPBW/EXP),$$

where F is the upper frequency limit of the video base band (4.2 MHz), FASC is the frequency of the auxiliary subcarrier (3.58 MHz), SPBW is the side panel bandwidth before time expansion (0.642 MHz), and EXP is the side panel time expansion factor (3.0).

The choice of the 3.58 MHz chrominance subcarrier frequency as the auxiliary subcarrier frequency provides several other benefits. Hardware cost and complexity are reduced because this frequency is readily available at both the transmitter encoder and the receiver decoder. Quadrature crosstalk around 3.58 MHz creates similar chrominance artifacts in both center and side panels, thereby reducing dissimilarities in displayed side and center panel information. A so-called "jail bars" artifact is also significantly reduced or eliminated from an image displayed by a compatible receiver which receives the processed widescreen signal, since side panel chrominance information is placed horizontally adjacent to side panel luminance information in the frequency spectrum associated with the auxiliary subcarrier. The "jail bars" artifact is caused by modulation of high energy side panel chrominance information into portions of the horizontal-vertical-temporal spectrum that are demodulated as flickering luminance stripes in compatible NTSC receiver displays. In the disclosed system, interference caused by side panel chrominance information on standard NTSC receivers is advantageously controllable by means of the color saturation adjustment which is available to a viewer.

Some advanced television systems advantageously employ the signal processing technique of intraframe averaging for encoding side and center panel information to facilitate their subsequent separation at a receiver. One such system is disclosed in U.S. Pat. No. 4,855,811 of M. A. Isnardi, for example. Intraframe averaging can begin at 1.5 MHz in the time expanded center panel region of the main signal to avoid impairing lower frequency vertical detail information, and encompasses the entire frequency range of side panel luminance highs and side panel chrominance signals. In the system to be described herein, intraframe averaging of side panel information advantageously begins at a higher frequency than in the previously mentioned known widescreen system described in U.S. Pat. No. 4,856,811, resulting in improved side panel motion rendition.

The system disclosed herein also exhibits less noise in the reconstructed side panel regions compared to the system described in U.S. Pat. No. 4,855,811. Most of the noise is associated with the side panel low frequency information, which had been time compressed by a factor of six prior to transmission. A reduced side panel low frequency time compression factor permitted by the present system beneficially reduces the amount of noise developed in reconstructed side panel low frequency information.

Figure 2:
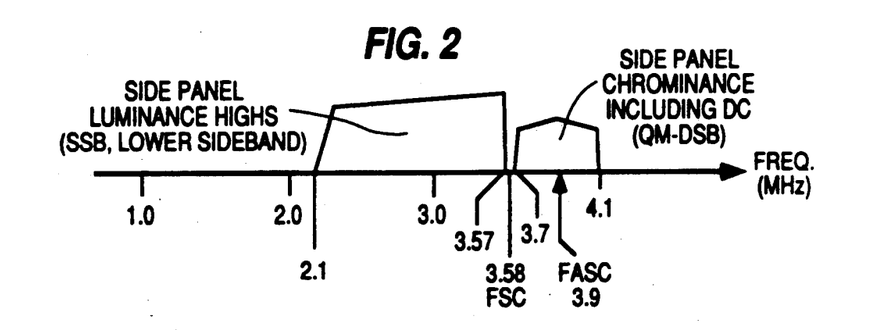
FIGS. 2 and 3 illustrate optional frequency spectrums for side panel information in accordance with the present invention.

FIG. 2 shows a side panel modulation frequency response associated with an optional choice of an auxiliary subcarrier frequency FASC at 3.9 MHz. With this modulation scheme, the lower limit of the modulated side panel information occurs at a higher frequency (2.1 MHz) than the modulation scheme of FIG. 1 (1.78 MHz). This result advantageously permits intraframe averaging of main panel information, as will be seen in FIG. 7, to begin at a higher frequency (approximately 2 MHz) for better main panel vertical-temporal response.

Figure 3:
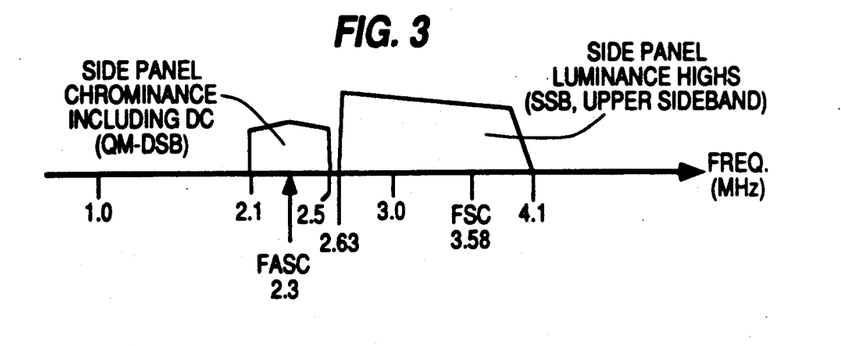

FIG. 3 depicts a side panel modulation frequency response associated with another optional choice of an auxiliary subcarrier frequency FASC at 2.3 MHz. This scheme also advantageously allows intraframe averaging of main panel information to begin at a higher frequency (approximately 2 MHz) compared to FIG. 1, for better main panel vertical-temporal response. This modulation scheme causes modulated side panel chrominance information to produce a downward moving "checkerboard" pattern which may be less visible than the flickering color interference pattern produced under certain conditions by the scheme of FIG. 1. However, such flickering color pattern is unlikely to be perceived by a viewer. Although the 4.1 MHz upper frequency limit of the scheme shown in FIG. 3 approaches the 4.2 MHz upper frequency limit of the video band, very little energy is exhibited near the upper frequency limit of side panel high frequency luminance information. Thus it is expected that the effects of intermediate frequency signal processing and filtering will not adversely affect side panel high frequency luminance information to a significant extent. In addition, the low energy upper frequency region of side panel high frequency luminance information could be attenuated slightly, if necessary, without seriously degrading the quality of the side panel image.

Figure 7:
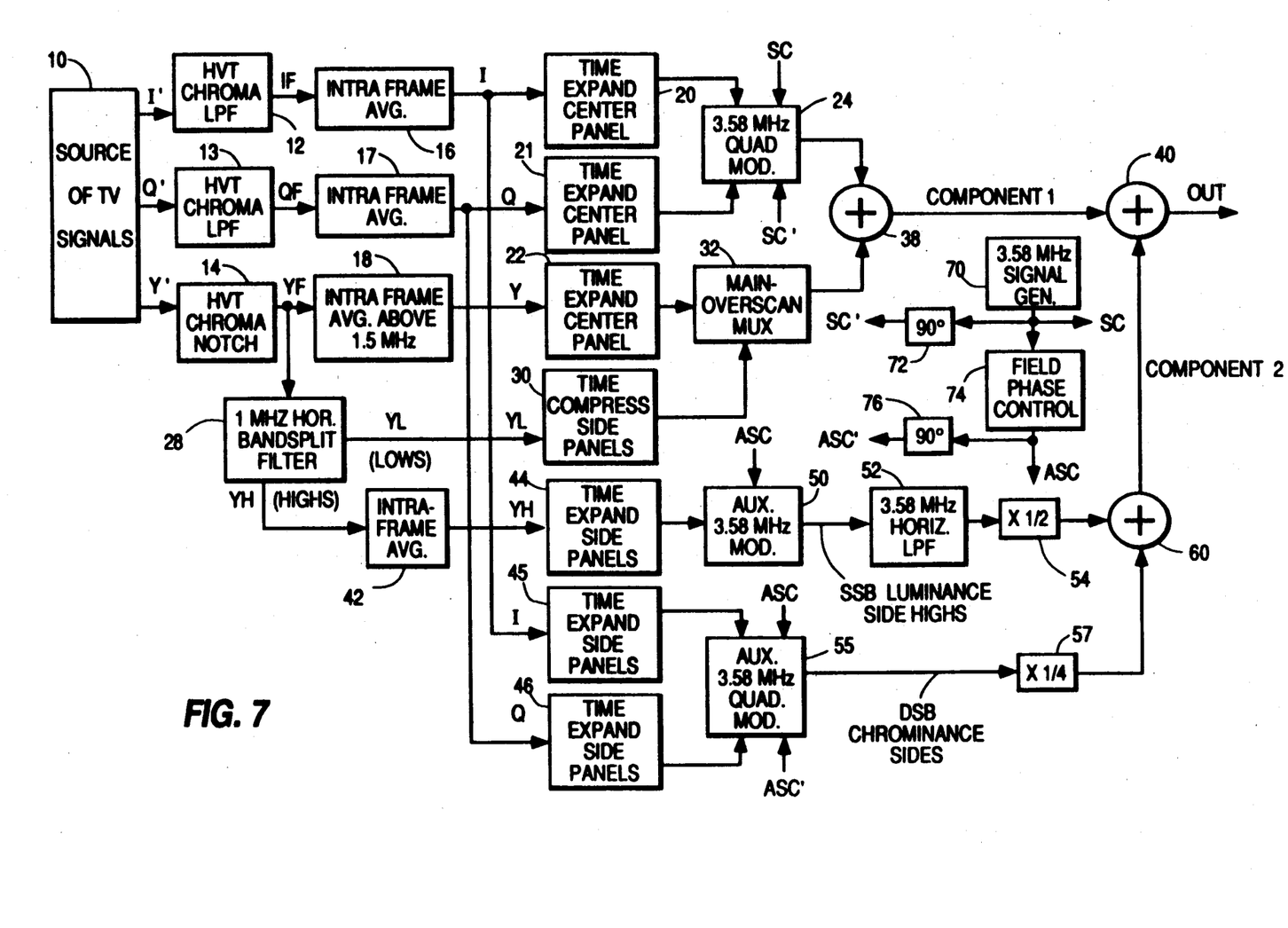
FIGS. 7 and 8 respectively show compatible widescreen television signal encoder and decoder apparatus according to the invention.

FIG. 7 shows details of widescreen television signal transmitter apparatus for encoding a compatible widescreen television signal in accordance with the present invention. In this example it is assumed that each of the left and right horizontal overscan regions is about 2 microseconds wide. A television signal source 10, such as a television camera, provides 525 line, 2:1 interlaced chrominance components I' and Q' and a luminance component Y'. The I and Q chrominance components are respectively low pass filtered in the horizontal, vertical and temporal (HVT) dimensions by units 12 and 13 to produce filtered components IF and QF. Units 12 and 13 each include a 3×3 (pixel) diamond shaped low pass filter oriented along vertical-temporal (VT) diagonal axes, and a 600 KHz horizontal low pass filter. Luminance component Y' is filtered by an HVT chrominance notch (band reject) filter 14 to produce a filtered luminance component YF. Filter 14 includes an input 3×3 VT chrominance bandpass filter which receives signal Y', followed by a 2.0 MHz horizontal high pass filter. An output signal from the high pass filter is subtracted from input signal Y' to produce output signal YF.

Components IF, QF and YF are separately intraframe averaged by means of units 16, 17 and 18, respectively. As disclosed in U.S. Pat. No. 4,855,811 for example, intraframe averaging is a signal conditioning technique which prepares two spatially correlated signals for mutual combining so that they can be recovered efficiently and accurately afterwards, such as by means of a field storage device. More specifically, with this technique a group of pixels one field (262H) apart is made to contain pixels of identical value such as by replacing original pixel values with their average value. Signal YF is intraframe processed above a given frequency such as 1.5 MHz, while the full bandwidth of signals IF and QF is intraframe processed. Frequency selective intraframe processor 18 includes a bandsplitter which provides low band and high band (above 1.5 MHz) output components. The high band component is intraframe averaged and afterwards combined with the low band component to form the output signal of processor 18.

The center panel areas of intraframe averaged signals Y, I and Q are time expanded by a factor 1,284 in units 20, 21 and 22 respectively. The I and Q components from units 20 and 21 are applied to a chrominance modulator 24 where they respectively modulate 3.58 MHz quadrature phase related standard chrominance subcarriers SC and SC'. Subcarriers SC and SC' are generated by a network including a 3.58 MHz sinusoidal signal generator 70 for developing carrier SC, and a 90° phase shifter 72 for developing quadrature carrier SC' from carrier SC. An auxiliary subcarrier ASC is derived from carrier SC by means of a field phase control unit 74, which produces auxiliary carrier ASC with a phase that inverts from one field to the next relative to the phase of the standard chrominance subcarrier. A 90° phase shifter 76 produces an auxiliary subcarrier ASC' in phase quadrature with auxiliary subcarrier ASC.

Signal YF from filter 14 is also applied to a 1 MHz horizontal bandsplit filter 28 which divides signal YF into a low frequency component YL including DC, and a high frequency component YH above 1 MHz. The side panel region of signal YL is time compressed by a factor of 4.0 in a unit 30. The output signal from unit 30 contains side panel low frequency information time compressed into respective right and horizontal image overscan regions, each of which is assumed to be about 2 microseconds wide in this example. The time compressed luminance side lows signal from unit 30 and the time expanded center panel luminance signal from unit 22 are time multiplexed together by means of a time multiplexer (MUX) unit 32. An adder 38 combines the modulated center panel chrominance signal from unit 24, and the signal from MUX 32 containing main panel luminance information and low frequency side panel luminance information compressed into horizontal overscan regions, to produce an output signal designated as component 1.

Component 1 contains information which is compatible with standard television receivers having a 4×3 image aspect ratio. This component is combined in a unit 40 with additional side panel information contained in a component 2 to produce a compatible widescreen television signal which will develop a 16×9 widescreen image when displayed by a widescreen receiver. The output signal from combiner 40 can be conveyed via any number of conventional transmission media such as terrestrial RF broadcast or cable, for example.

Side panel information component 2 is developed as follows. Luminance side highs signal YH from filter 28 is intraframe averaged by a unit 42 before being applied to a unit 44 which time expands the side panel portions of signal YH by a factor of 3.0. The side panel of chromiance components I and Q from units 16 and 17 are similarly processed by units 45 and 46, respectively. Thus the output signal from unit 44 contains time expanded high frequency side panel luminance information, and the output signals from units 45 and 46 respectively contain time expanded side panel I and Q chrominance information.

The luminance side highs output signal from unit 44 is applied to an auxiliary modulator 50 for modulating 3.58 MHz auxiliary subcarrier ASC having a field reversing phase relative to the phase of standard chrominance subcarrier SC. A resulting double sideband modulated output signal from modulator 50 is converted to a single sideband signal by removing the upper sideband via a 3.58 MHz horizontal low pass filter 52. Side panel chrominance components I and Q from units 45 and 46 modulate respective quadrature phase related 3.58 MHz field phase inverting auxiliary subcarriers ASC and ASC' in an auxiliary quadrature modulator 55 to produce a double sideband chrominance side panels modulated auxiliary signal. In this example the side panel luminance highs component and the side panel chrominance I component modulate the same phase of the auxiliary carrier, ASC, via modulators 50 and 55 respectively.

The single sideband luminance side highs signal from filter 52 and the double sideband chrominance sides signal from modulator 55 are amplitude attenuated by factors of 0.5 and 0.25 in units 54 and 57 respectively, to reduce the likelihood of these signals creating interference in standard aspect ratio compatible receivers. The double sideband chrominance modulated signal from modulator 55 is attenuated more heavily than the single sideband modulated signal from modulator 50 because the chrominance modulated signal contains more energy due to its double sideband nature and due to the fact that it may contain a high energy DC component, e.g., in the case of a color video signal. The attenuated signals from units 54 and 57 are combined in an adder 60 to produce component 2, which is thereafter combined with component 1 in adder 40.

Figure 8:
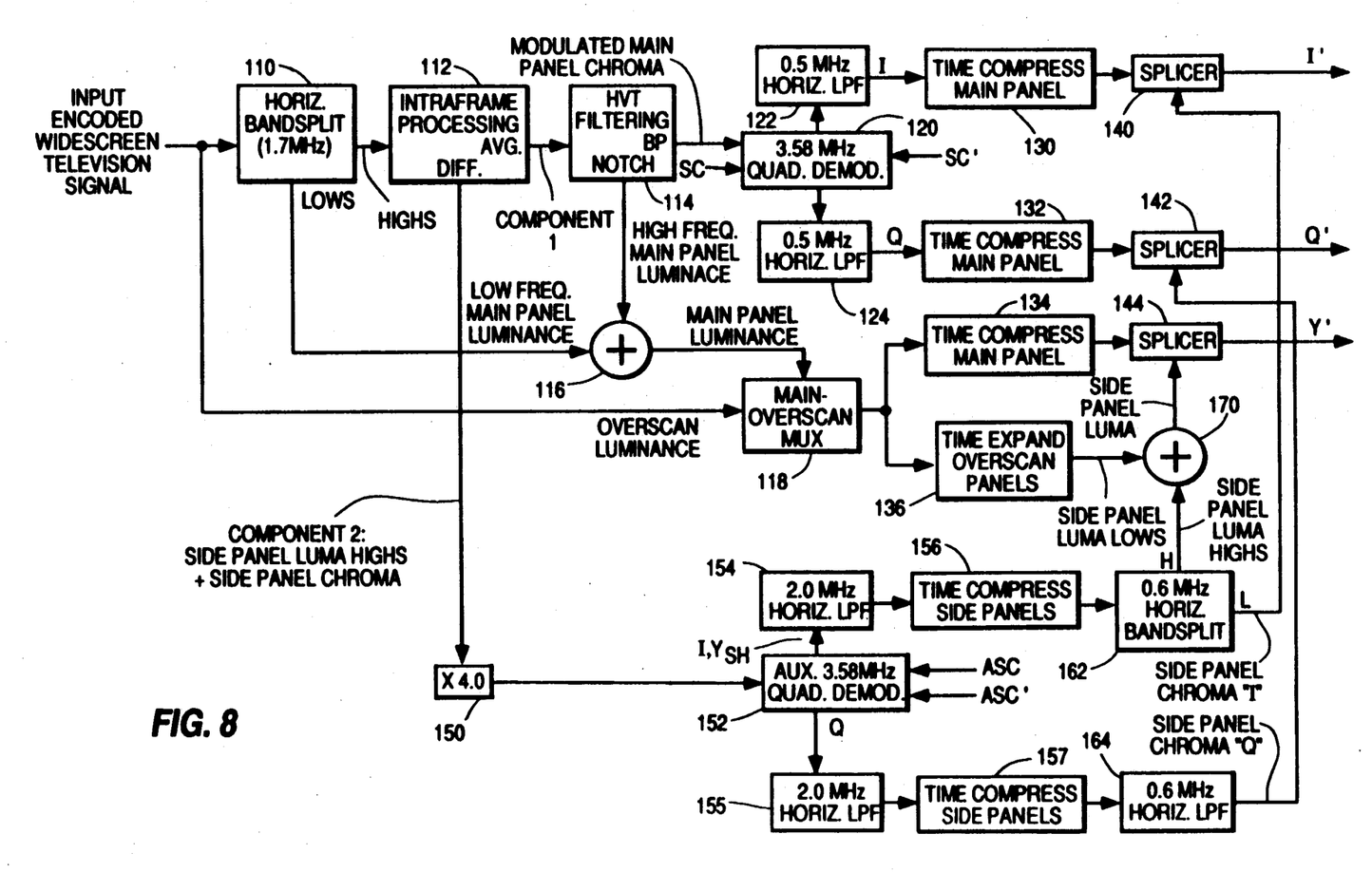

FIG. 8 shows details of a portion of a widescreen television receiver including apparatus for decoding the widescreen signal generated by the arrangement of FIG. 7. A received baseband encoded widescreen television signal (e.g., from an RF tuner and intermediate frequency assembly not shown) is applied to a 1.7 MHz horizontal bandsplit filter for producing an output low band signal (LOWS), and an output high band signal (HIGHS) which is applied to an intraframe processor 112. Processor 112 averages (additively combines) and differences (subtractively combines) image lines 262H apart within frames, above 1.7 MHz, to recover main component 1 at an averaging output AVG, and auxiliary component 2 at a differencing output DIFF, substantially free of vertical-temporal crosstalk. A 200 KHz horizontal crosstalk guardband is provided between the lower limit operating frequency of unit 112 and the 1.5 MHz lower limit operating frequency of the center panel intraframe averager in the encoder of FIG. 7. Recovered component 1 from unit 112 contains information which is essentially identical to image information of main component 1 developed at the encoder due to high intraframe spatial correlation. Additional details of processor 112 can be found in previously mentioned U.S. Pat. No. 4,855,811.

The main component signal from the averaging output (AVG) of unit 112 is subjected to three dimensional horizontal, vertical and temporal filtering in a filter 114. Filter 114 includes 3×3 V-T and horizontal filtering networks for providing modulated main panel chrominance information at a bandpass (BP) output, and high frequency main panel luminance information devoid of chrominance information at a chrominance notch output (NOTCH). An adder 116 combines the low and high frequency main panel luminance components from the outputs of filters 110 and 114 to produce reconstituted main panel luminance information at an output. This information is combined with the overscan region luminance information (which includes the time compressed side panel low frequency information) by means of a time multiplexer 118.

The modulated main panel chrominance component from filter 114 is demodulated by means of a quadrature demodulator 120 responsive to quadrature phase related locally generated standard chrominance subcarrier reference signals SC and SC'. Demodulated output signals from unit 120 are horizontally low pass filtered by means of 0.5 MHz filters 122 and 124 respectively to produce narrowband chrominance components I and Q, which are respectively time compressed by main panel compression units 130 and 132 with the inverse of the corresponding main panel time expansion factor at the encoder so as to restore the original spatial dimensions of the main panel information. Similarly, the main panel and overscan components of the output signal from MUX 118 are respectively time compressed and time expanded by means of units 134 and 136 to restore their original spatial relationships.

Restored main panel chrominance component I from unit 130 and restored side panel chrominance component I from unit 162 are spliced by means of a splicer 140 to produce a reconstituted 525 line 2:1 interlaced widescreen color component I'. Restored main panel chrominance component Q from unit 132 and a restored side panel chrominance component Q from a unit 164 are spliced by means of a splicer 142 to produce a reconstituted widescreen color component Q'. Restored main panel luminance information from unit 134 and restored side panel luminance information are spliced by means of a unit 144 to produce reconstituted widescreen luminance component Y'. Reconstituted widescreen components I', Q' and Y' are afterwards matrixed and processed by conventional television video signal processing networks to produce color image representative signals suitable for display by an image reproducing device. The side panel components which are combined with the main panel components as noted above are developed from component 2 as follows.

Component 2 from the differencing (DIFF) output of processor 112 is amplified by a factor of 4.0 in a unit 150 to compensate for the attenuation by a factor of 0.25 in unit 57 of the encoder. The amplified signal is then demodulated by a quadrature demodulator 152 which responds to quadrature phase related auxiliary reference subcarrier signals ASC and ASC' having the same characteristics as the corresponding signals employed by the auxiliary modulator network at the encoder. One demodulated output of unit 152 is filtered by a 2.0 MHz horizontal low pass filter 155 to produce side panel chrominance component Q. The other demodulated output of unit 152 is filtered by a 2.0 MHz horizontal low pass filter 154 to produce a signal containing side panel high frequency luminance information and side panel chrominance component I. The side panel output signals from filters 154 and 155 are time compressed by units 156 and 157, which respectively exhibit the inverse of the encoder side panel time expansion factor. The output signal from unit 156 is processed by a 0.6 MHz horizontal bandsplit filter 162 to produce a side panel luminance high frequency component at a high pass output (H), and the side panel chrominance I component at a low pass output (L). An adder 170 combines the side panel luminance highs component with the side panel luminance lows component from unit 136 to produce the reconstituted side panel luminance component which is applied to splicer 144. The output signal from unit 157 is processed by a 0.6 MHz horizontal low pass filter 164 to produce side panel chrominance component Q which is applied to splicer 142 as mentioned previously.

The process of time compression via unit 156 before bandsplitting in unit 162 advantageously develops wider frequency separation between the side panel I component and side panel high frequency luminance component $Y_{SH}$. This allows the design parameters of bandsplitter 162 to be relaxed. The design parameters of filter 164 also are permitted to be relaxed due to prior time compression by means of network 157.

What is claimed is:

1. In a system for processing a widescreen television-type signal containing main panel information and side panel information, apparatus comprising:
   means for processing said main panel information;
   means for providing an auxiliary subcarrier signal other than a standard chrominance subcarrier signal;
   means for modulating said auxiliary subcarrier with side panel chrominance information to form a double sideband modulated auxiliary subcarrier with respect to said side panel chrominance information; and means for modulating said auxiliary subcarrier with side panel high frequency luminance information exclusive of DC information to form a single sideband modulated auxiliary subcarrier with respect to said side panel high frequency luminance information.

2. A system according to claim 1, wherein
said auxiliary subcarrier inverts phase every 262H where H is a horizontal line interval.

3. A system according to claim 1, wherein
said auxiliary subcarrier is at the frequency of said standard chrominance subcarrier and exhibits a field inverting phase relative to the phase of said standard chrominance subcarrier.

4. A system according to claim 3, wherein
said side panel high frequency luminance information constitutes lower sideband information of said single sideband signal.

5. A system according to claim 1, wherein
said auxiliary subcarrier is at a frequency less than the frequency of said standard chrominance subcarrier; and
said side panel high frequency luminance information constitutes upper sideband information of said single sideband signal.

6. A system according to claim 1, wherein
said auxiliary subcarrier is at a frequency greater than the frequency of said standard chrominance subcarrier; and
said side panel high frequency luminance information constitutes lower sideband information of said single sideband signal.

7. A system according to claim 1, wherein
side panel low frequency information is time compressed into an overscan region of said television signal.

8. A system according to claim 1, wherein
said auxiliary subcarrier is at a frequency above the frequency of said standard chrominance subcarrier.

9. A system according to claim 1, wherein
said auxiliary subcarrier is at the frequency of said standard chrominance subcarrier and exhibits a field inverting phase relative to the phase of said standard chrominance subcarrier;
said auxiliary subcarrier is quadrature modulated with side panel chrominance information; and
said side panel high frequency luminance information constitutes lower sideband information of said single sideband modulated auxiliary subcarrier.

10. A system according to claim 1, wherein
said modulated auxiliary subcarrier is combined with processed main panel information in a common signal channel.

11. In a system for receiving a widescreen television-type signal containing main panel information, side panel chrominance information modulating an auxiliary subcarrier other than a standard chrominance subcarrier in double sideband form, and side panel high frequency luminance information exclusive of low frequency luminance information modulating said auxiliary subcarrier in single sideband form; apparatus comprising:
means for separating said main panel information and said modulated side panel information
demodulator means responsive to a reference signal for demodulating said side panel information;
means for processing demodulated side panel information; and
means for combining processed demodulated side panel information with separated main panel information.

12. Apparatus according to claim 11, wherein
said reference signal is at the frequency of said standard chrominance subcarrier and exhibits a field inverting phase relative to the phase of said standard chrominance subcarrier.

13. Apparatus according to claim 11, wherein
said auxiliary subcarrier and said reference signal each exhibit a field inverting phase.

14. Apparatus according to claim 11, wherein
said auxiliary subcarrier is quadrature modulated with first and second side panel chrominance components; and
said reference subcarrier comprises quadrature phase related components.

15. Apparatus according to claim 11, wherein
one of said first and second side panel chrominance components and said side panel high frequency luminance information are modulated in common with one of said quadrature phase related components of said reference signal.

16. Apparatus according to claim 11, wherein
said separating means includes means for summing and differencing picture elements separated by an image field for respectively producing separated main panel information and separated modulated main panel information.

17. Apparatus according to claim 11, wherein
said demodulating means comprises quadrature demodulator means responsive to separated modulated side panel information and to said reference signal for providing a first demodulated signal including a first side panel chrominance component at a first output, and a second demodulated signal including a second side panel chrominance component and a side panel high frequency luminance component at a second output.

18. Apparatus according to claim 17, wherein
said reference signal exhibits a field inverting phase unlike the phase of said standard chrominance subcarrier.

19. Apparatus according to claim 17 and further comprising
means for filtering output signals from said demodulating means for providing separate first and second side panel chrominance components and a separate side panel high frequency luminance component; and
means for combining said separate side panel luminance and chrominance components with main panel information to form a widescreen image.

20. Apparatus according to claim 17 and further comprising
means for time compressing said second demodulated signal; and
means responsive to said time compressed second demodulated signal for separating said second side panel chrominance component and said side panel high frequency luminance component.

21. Apparatus according to claim 17 and further comprising
means for time compressing said first demodulated signal; and
means for filtering said time compressed first demodulated signal.

22. In a system for processing a widescreen television-type signal containing main panel information and side panel information comprising a luminance component and I and Q chrominance components, apparatus including:

means for processing said main panel information;

means for providing first and second differently phased auxiliary subcarrier signal components, other than a standard chrominance subcarrier, at a common frequency;

means for modulating said first auxiliary subcarrier component with said side panel I chrominance component to form a double sideband modulated signal with respect to said side panel I chrominance component; and means for modulating said second auxiliary subcarrier component with (a) said side panel Q chrominance component to form a double sideband modulated signal with respect to said side panel Q chrominance component, and with (b) side panel high frequency luminance information to form a single sideband modulated signal with respect to said side panel high frequency luminance information.

23. In a system for receiving a widescreen television-type signal containing main panel information, side panel information comprising a luminance component and I and Q chrominance components, and first and second differently phased auxiliary subcarrier signal components, other than a standard chrominance subcarrier, at a common frequency, said side panel I chrominance component modulating said first auxiliary subcarrier component in double sideband form, said side panel Q chrominance component modulating said second auxiliary subcarrier component in double sideband form, and said side panel luminance component modulating said second auxiliary subcarrier component in single sideband form; apparatus comprising:

means for separating said main panel information and said modulated side panel information;

demodulator means responsive to reference signals exhibiting said phases of said differently phased auxiliary subcarrier components for providing demodulated side panel chrominance information including said I and Q components, and a demodulated side panel luminance component;

means for processing said demodulated side panel components; and means for combining processed demodulated side panel information with separated main panel information.

24. Apparatus according to claim 23, wherein said first and second auxiliary subcarriers components are quadrature phase related.

* * * * *